No. 822,376. PATENTED JUNE 5, 1906.
B. G. LAMME.
SYSTEM OF APPLYING ALTERNATING CURRENT ELECTRICAL ENERGY.
APPLICATION FILED SEPT. 22, 1904.
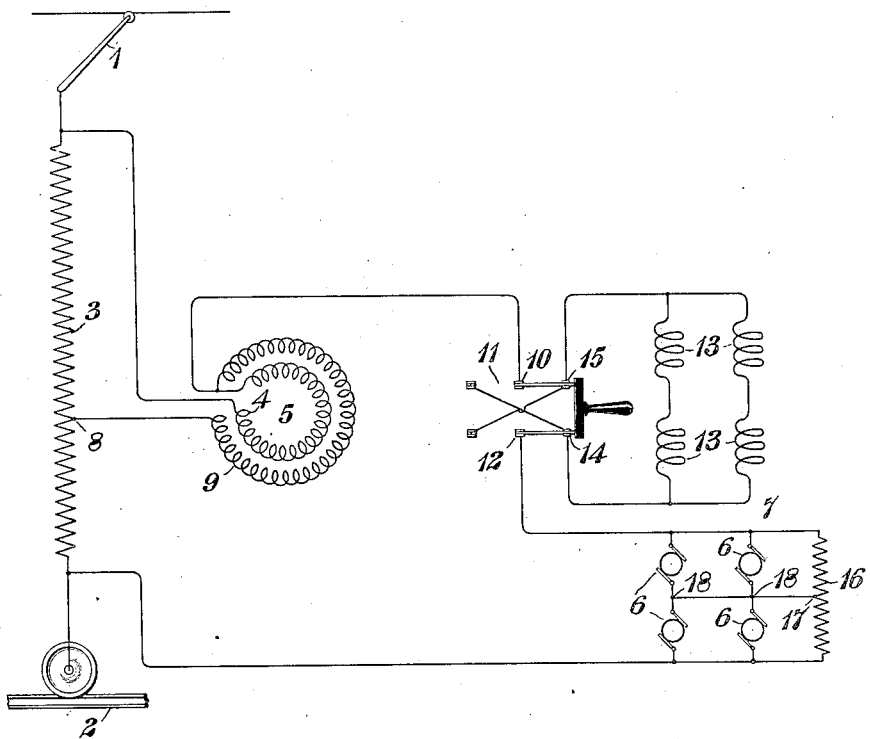
WITNESSES:
C. L. Belcher
Otto S. Schairer.
INVENTOR
Benjamin G. Lamme
BY
Wesley G. Carr
ATTORNEY

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF APPLYING ALTERNATING-CURRENT ELECTRICAL ENERGY.

No. 822,376.  Specification of Letters Patent.  Patented June 5, 1906.

Application filed September 22, 1904. Serial No. 225,482.

*To all whom it may concern:*

Be it known that I, BENJAMIN G. LAMME, a citizen of the United States, and a resident of Pittsburg, in the county of Allegheny and State of Pennsylvania, have invented a new and useful Improvement in Systems of Applying Alternating-Current Electrical Energy, of which the following is a specification.

My invention relates to systems of applying electrical energy to alternating-current translating devices—such, for example, as railway-motors.

My invention has for its object to provide means for equalizing the differences of potential between terminals of two or more series-connected motors, motor-armatures, or other translating devices.

It has been proposed to propel railway-vehicles by means of alternating-current electric motors of the commutator type having their armature and field-magnet windings connected in series relation, and it has been found that when two or more such motors are mounted upon the same car it is often desirable to connect all of the field-magnet windings either in series or in series-parallel relation and to also connect the armature-windings either in series or series-parallel relation and to reverse the direction of the current or the direction of the drop of potential through the one or the other of the field-magnet and armature windings for the purpose of reversing the direction of rotation. If the motors are geared to different driving-axles, it is extremely desirable to provide means for equalizing the potential differences between the terminals of the armature-windings, for the reason that if one pair of wheels should slip the counter electromotive force of the motor which is geared to the axle of that pair of wheels would rise until substantially the full potential difference across the terminals of both or all of the motors would be applied across the terminals of the other motor or motors. This abnormal rise of potential might become dangerous to the insulation, and the speed of the motor-armature that is geared to the axle of the slipping-wheels might become so high as to cause damage.

The single figure of the accompanying drawing is a diagram of a system which embodies my invention.

Alternating-current electrical energy is supplied from a trolley 1 and a track-rail 2 to an autotransformer-winding 3, the terminals of which may be respectively connected to the primary winding 4 of a suitable voltage-regulator 5 and to corresponding terminals of two of the armature-windings 6 of the motors 7.

An intermediate point 8 of the autotransformer-winding 3 is connected to one terminal of secondary winding 9 of the voltage-regulator 5, the other terminal of the said winding being connected to one terminal of the primary winding 4 of the regulator and to terminal 10 of a reversing-switch 11. Terminal 12 of the reversing-switch 11 is connected to corresponding terminals of two of the armature-windings 6. The field-magnet windings 13 of the motors 7 are connected in series-parallel relation between terminals 14 and 15 of the reversing-switch.

As here indicated, four motors 7 are employed, the armature-windings 6 of which are connected together in series-parallel relation and the field-magnet windings of which are connected together in a similar relation, though it is to be understood that any other number of motors may be employed; that the field-magnet windings may be connected together in any other suitable relation, and that the armature-windings may be connected together all in series, if desired.

In order to equalize the differences of potential between the terminals of the respective motor-armatures, an autotransformer-winding 16 is connected between the outer terminals of the armatures and an intermediate point 17 is connected to the points 18 or to the armature-windings terminals which are connected together.

Since the differences of potential between the point 17 and the terminals of the winding 16 have a fixed ratio, the differences of potential between the points 18 and the outer terminals of the armature-windings 6 have also a fixed ratio, and consequently none of the armatures can attain such a speed as to generate a counter electromotive force greater than the difference of potential between the terminals of the corresponding portion of the autotransformer-winding. Since the motors will usually be similar in all respects, the point 17 will ordinarily be located midway between the terminals of the winding 16 and the differences of potential between the terminals of the respective motors will be maintained equal.

While I have shown the field-magnet and armature windings as connected in specific relations to each other and in a specific arrangement as regards the reversing-switch, it is to be understood that these connections are only illustrative and that my invention is not limited to such arrangements.

The operation of the invention remains the same whether two or more motor-armatures are connected in series or in any symmetrical series-parallel arrangement, if leads from the autotransformer-winding are connected to the proper points. Furthermore, the invention may be utilized in connection with translating devices other than motors, if desired.

The voltage-regulating device may be of any suitable and desirable character, the one which I have chosen for the purpose of illustrating the operation of my invention being merely illustrative and in no sense restrictive.

The energy may also be derived from any other suitable source, and it may be delivered directly to the voltage-regulating device without the intervention of transformers, providing the voltage is of such value as may be safely applied to the voltage-regulating device.

It may occasionally be convenient to omit the voltage-regulating device and to connect the translating devices directly between leads from the main transformer-winding, in which case the terminals of the said devices which are connected together may be connected to a point in the said winding that is intermediate the said leads.

I claim as my invention—

1. The combination with a source of alternating-current electrical energy and two or more motors having series-parallel-connected field-magnet windings and series-connected armature windings, of means for equalizing the potential differences between the terminals of the said armature-windings.

2. The combination with a source of alternating-current electrical energy and two or more motors having series-parallel-connected field-magnet windings and series-connected armature-windings, of a transformer-winding having connections to the outer terminals of the armature-windings and an intermediate connection to the armature-winding terminals which are connected together.

In testimony whereof I have hereunto subscribed my name this 20th day of September 1904.

BENJ. G. LAMME.

Witnesses:
OTTO S. SCHAIRER,
BIRNEY HINES.